United States Patent [19]
Kawanishi et al.

[11] Patent Number: 5,606,556
[45] Date of Patent: Feb. 25, 1997

[54] MULTIPLEX TRANSMISSION SYSTEM

[75] Inventors: Toshiaki Kawanishi, Akishima; Koji Terayama, Hiroshima, both of Japan

[73] Assignee: Mazda Motor Corporation, Hiroshima, Japan

[21] Appl. No.: 365,862

[22] Filed: Dec. 29, 1994

[30] Foreign Application Priority Data

Dec. 30, 1993 [JP] Japan .................................. 5-351245

[51] Int. Cl.⁶ .............................................. H04J 3/00
[52] U.S. Cl. ........................................ 370/471; 370/447
[58] Field of Search ........................ 370/85.1, 85.2, 370/85.3, 85.6, 85.15, 99, 79, 111; 375/219

[56] References Cited

U.S. PATENT DOCUMENTS

| | | | |
|---|---|---|---|
| 4,596,013 | 6/1986 | Tashiro et al. | 370/85.15 |
| 5,251,211 | 10/1993 | Mutoh et al. | 370/85.1 |
| 5,345,474 | 9/1994 | Hoshikawa | 375/219 |

FOREIGN PATENT DOCUMENTS 1-143533  6/1989  Japan .

*Primary Examiner*—Douglas W. Olms
*Assistant Examiner*—Min Jung

[57] ABSTRACT

An object of this invention is to provide a multiplex transmission system which can temporarily use an existing data area as a destination address area and an area for designating data to be transmitted when a communication node of the multiplex transmission system is started or reset, and can prevent unnecessary data other than designated data from being transmitted even when a data sendback request is issued to another communication node to which a transmission request is to be issued. In a multiplex transmission system in which a plurality of communication nodes A to E are connected via a multiplex transmission path MB, each communication node transmits a communication frame in which event data of, e.g., switch ON states of its own lamps, motors, and the like, via the multiplex transmission path MB, and the communication frame is received by all the communication nodes when a communication state is normal, when the communication node A at the transmitting side issues a data transmission request to another communication node D, the communication node A writes data representing that a frame F is a transmission request frame in an existing data area I, and the address of the communication node D which is to receive the frame F and ID(0) to ID(3) of data to be transmitted from the communication node D in data write areas D-0 to D-3, and transmits the frame.

27 Claims, 6 Drawing Sheets

| DATA ID | DATA 0 | DATA 1 | DATA 2 | DATA 3 |
|---|---|---|---|---|
| 0 | LAMP 1 ON/OFF | LAMP 3 ON/OFF | ～ | ～ |
| 1 | LAMP 2 ON/OFF | LAMP 4 ON/OFF | ～ | ～ |
| 2 | MOTOR 1 ON/OFF | MOTOR 3 ON/OFF | ～ | ～ |
| 3 | MOTOR 2 ON/OFF | MOTOR 4 ON/OFF | ～ | ～ |
| ⋮ | ⋮ | ⋮ | ⋮ | ⋮ |

| SD AREA | DESTINATION ADDRESS AREA | SOURCE NODE ADDRESS AREA | ID | DATA LENGTH | DATA | CHECK CODE |

MULTIPLEX TRANSMISSION SYSTEM

BACKGROUND OF THE INVENTION

1. Field of the Invention

The present invention relates to a multiplex transmission system used in, e.g., a control system of a vehicle.

2. Summary of the Invention

A conventional multiplex transmission system for a vehicle, which uses a transmission system called CSMA/CD (Carrier Sense Multiple Access/Collision Detection), is constituted by connecting a plurality of multiplex transmission nodes to each other via a multiplex transmission path. Upon transmission/reception of data, each communication node writes necessary data in a predetermined data area in a predetermined communication frame, and transmits the communication frame via the multiplex transmission path, thus exchanging data representing operation information, and the like of a vehicle.

For example, Japanese Patent Laid-Open No. 1-143533 discloses, as a communication frame format for a multiplex transmission node, a communication frame format constituted by an SD (Start Delimiter) area, a destination address area, a source address area, a frame ID area, a data length write area, a data write area, and a check code write area, as shown in FIG. 8. The SD area in this reference is an area in which a specific code (SD code) indicating the start of a communication frame is written, the destination address area is an area in which the address of a communication node which is to receive this communication frame is written, the source address area is an area in which the address of a communication node at the transmitting side of this communication frame is written, the frame ID area is an area in which data for specifying the contents of communication data to be transmitted by this communication frame is written, the data length write area is an area in which the number of data written in this frame is written, the data write area is an area in which specific data to be transmitted by this frame is written, and the check code write area is an area in which a check code indicating the end of this frame is written.

Since the communication frame with this format includes the destination address area, this communication frame can be prevented from being received by a communication node other than a communication node designated by the destination address area. Since this destination address area is assigned, when a data sendback request is to be transmitted to a specific communication node using this communication frame, transmission of an unnecessary signal from another communication node can be prevented.

However, in the above-mentioned conventional multiplex transmission system, even when the system performs normal communications as a whole and the destination address need not be especially specified, since the frame includes the destination address area, the frame length is large, and for this reason, the busy time of a multiplex transmission line is prolonged. A communication node which received the frame including the destination address area must read the address written in the destination address area in the frame each time it receives a frame, and must check if this communication frame is addressed to its own node, thus prolonging the discrimination time.

For this reason, a multiplex transmission system which adopts a system called a BROADCAST system using a communication frame from which a destination address area is omitted has been proposed.

However, in this BROADCAST multiplex transmission system, in particular, when a communication node is initialized (reset), data stored in the communication node is cleared. For this reason, when the reset node wants to request necessary data from another communication node, since the amount of data to be requested becomes large, the transmitting side must designate a node to which a transmission request is to be issued and data to be transmitted from the designated node. However, in the conventional BROADCAST system, since the frame has no destination address area, a node to which a transmission request is to be issued cannot be designated.

SUMMARY OF THE INVENTION

Therefore, the present invention has been made in consideration of the above-mentioned problems, and has as its object to provide a multiplex transmission system which can temporarily use existing data areas as a destination address area and an area for designating data to be transmitted when the multiplex transmission system is initialized, and can prevent unnecessary data other than designated data from being transmitted even when a data sendback request is issued to another communication node to which a transmission request is to be issued.

In order to solve the above-mentioned problems and to achieve the above object, a multiplex transmission system according to the invention described in claim 1 of the present invention is characterized by the following arrangement.

More specifically, in the multiplex transmission system in which a plurality of communication nodes are connected via a multiplex transmission path, each of the communication nodes transmits a communication frame, in which event data of its own node is written, via the multiplex transmission path, and when a communication state is not a predetermined state, the communication frame is received by all the communication nodes, the communication node at a transmitting side comprises: frame generation means for generating the communication frame including the event data; discrimination means for discriminating whether or not the communication state of the communication node at the transmitting side is the predetermined state; and format changing means for, when it is determined that the communication state is the predetermined state, changing a data format of the communication frame to write data representing that the communication frame is a data transmission request frame in an existing data area of the communication frame to be transmitted from the communication node, and to write an address of the communication node which is to receive the communication frame, and transmitting the communication frame, and the communication node at a receiving side comprises: frame transmission means for receiving the communication frame whose data format has been changed, and transmitting a new communication frame in which event data designated by the received communication frame is written.

As described above, according to the invention described in claim 1, the data format can be changed so that existing data areas are temporarily used as an area for designating a data transmission request frame and a destination address area, and even when a data sendback request is issued to another communication node to which a transmission request is to be issued, unnecessary data other than designated data can be prevented from being transmitted.

A multiplex transmission apparatus according to the invention described in claim 9 of the present invention is characterized by the following arrangement.

More specifically, the multiplex transmission apparatus which transmits a communication frame in which its own event data is written via a multiplex transmission path, comprises: detection means for detecting a predetermined condition at a transmitting side; frame generation means for generating a communication frame to be transmitted from the transmitting side, in an existing area of which data representing that the communication frame is a data transmission request frame and an address of a receiving side which is to receive the communication frame are written, on the basis of the detection result; and frame transmission means for transmitting the communication frame.

As described above, according to the invention described in claim 9, the data-format can be changed so that existing data areas are temporarily used as an area for designating a data transmission request frame and a destination address area, and only necessary data can be quickly transmitted while preventing transmission of unnecessary data from other communication nodes.

A multiplex transmission apparatus according to the invention described in claim 18 of the present invention is characterized by the following arrangement.

More specifically, the multiplex transmission apparatus for receiving a communication frame including event data transmitted from a transmitting side via a multiplex transmission path, comprises: reception means for receiving the communication frame transmitted from the transmitting side; detection means for detecting whether or not a specific communication frame is received; frame generation means for, when it is detected that the specific communication frame is received, generating a new communication frame in which predetermined data designated by the specific communication frame is written; and frame transmission means for transmitting the new communication frame.

As described above, according to the invention described in claim 18, since the transmitting side transmits a communication frame in which a data transmission request frame and a destination address area are designated in an existing data area, the receiving side can easily identify a specific communication frame, and only necessary data can be quickly transmitted while preventing transmission of unnecessary data from other communication nodes.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENT

The preferred embodiments of the present invention will be described in detail below with reference to the accompanying drawings.

Figure 1:
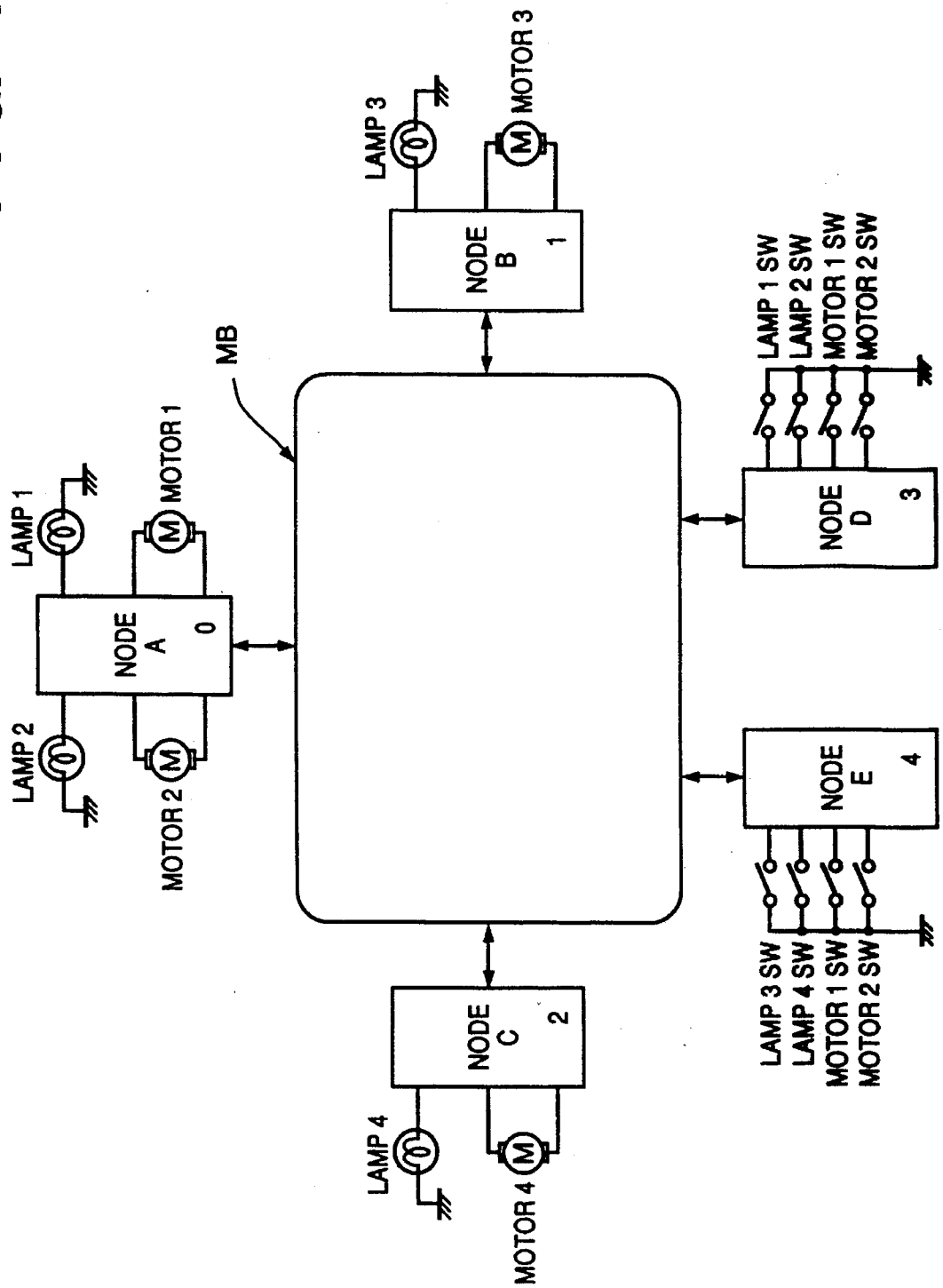
FIG. 1 is a schematic diagram showing the arrangement of a multiplex transmission system according to an embodiment of the present invention.

FIG. 1 is a schematic diagram showing an embodiment of a multiplex transmission system for a vehicle. The multiplex transmission system used in the description of the embodiment shown in FIG. 1 is assumed to be constituted by connecting five communication nodes A, B, C, D, and E to a multiplex transmission path MB, for the sake of simplicity. Referring to FIG. 1, lamps 1 and 2 and motors 1 and 2 are connected to the communication node A. A lamp 3 and a motor 3 are connected to the communication node B. A lamp 4 and a motor 4 are connected to the communication node C. A lamp 1 switch (SW), a lamp 2 SW, a motor 1 SW, and a motor 2 SW are connected to the communication node D. A lamp 3 SW, a lamp 4 SW, a motor 1 SW, and a motor 2 SW are connected to the communication node E.

Figures 2, 3:
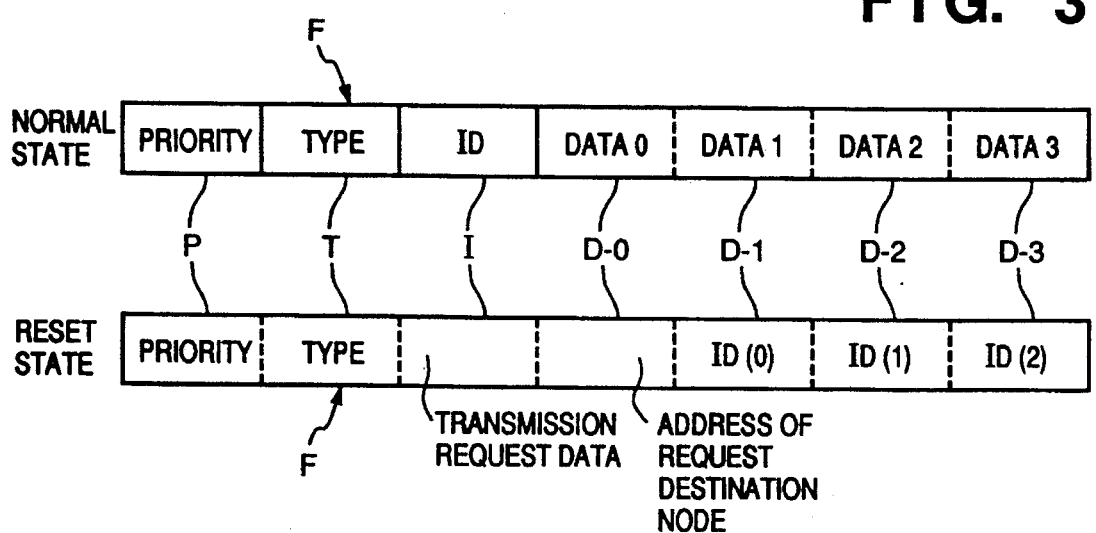
FIG. 2 is a chart showing data to be transmitted in a communication frame.
FIG. 3 shows the data format of a communication frame communicated by the multiplex transmission system of the embodiment shown in FIG. 1.

In a frame F used in communications in this multiplex transmission system, as shown in FIG. 3, a priority area P, a type area T, an ID area I, and data areas D-0, D-1, D-2, and D-3 are allocated in this order from the head to the end of the frame. In the priority area P, data indicating the priority order, i.e., which of frames is to be fetched first when the frame F contends with another frame is written. In the type area T, data indicating the length and the like of the frame F is written. In the ID area I, data representing the type of data to be transmitted in the frame F is normally written. In the data areas D-0, D-1, D-2, and D-3, data to be transmitted in the frame F is written. FIG. 2 is a chart showing the types of data and the data to be transmitted in the frame F. Referring to FIG. 2, for example, when data for turning on/off the lamp 1 is transmitted to the node A using the frame F, information indicating that data associated with the ON/OFF state of the lamp 1 is written, i.e., ID(0)-Data0 is written in the ID area in the frame F, and data indicating whether the lamp 1 is turned on or off is written in the data area D-0, in accordance with the chart shown in FIG. 2.

When the multiplex transmission system performs normal communications via a system rise state, the communication frame F in the ID area of which data representing the ON/OFF states of the lamps 1 and 2 and the motors 1 and 2 are written is transmitted, and is exchanged among the communication nodes A to E.

On the other hand, in a system start state (e.g., an engine start state) of the multiplex transmission system, or when the communication nodes A to E are reset due to, e.g., a communication abnormality to be described later, since the communication nodes A to E have different rise times, the communication nodes A to E cannot often acquire necessary data. In such a case, since the reset communication node must request necessary data from other communication nodes, and the amount of data to be requested becomes large, the transmitting side must designate a node to which a transmission request is to be issued, and data to be transmitted from the designated node.

Figure 5:
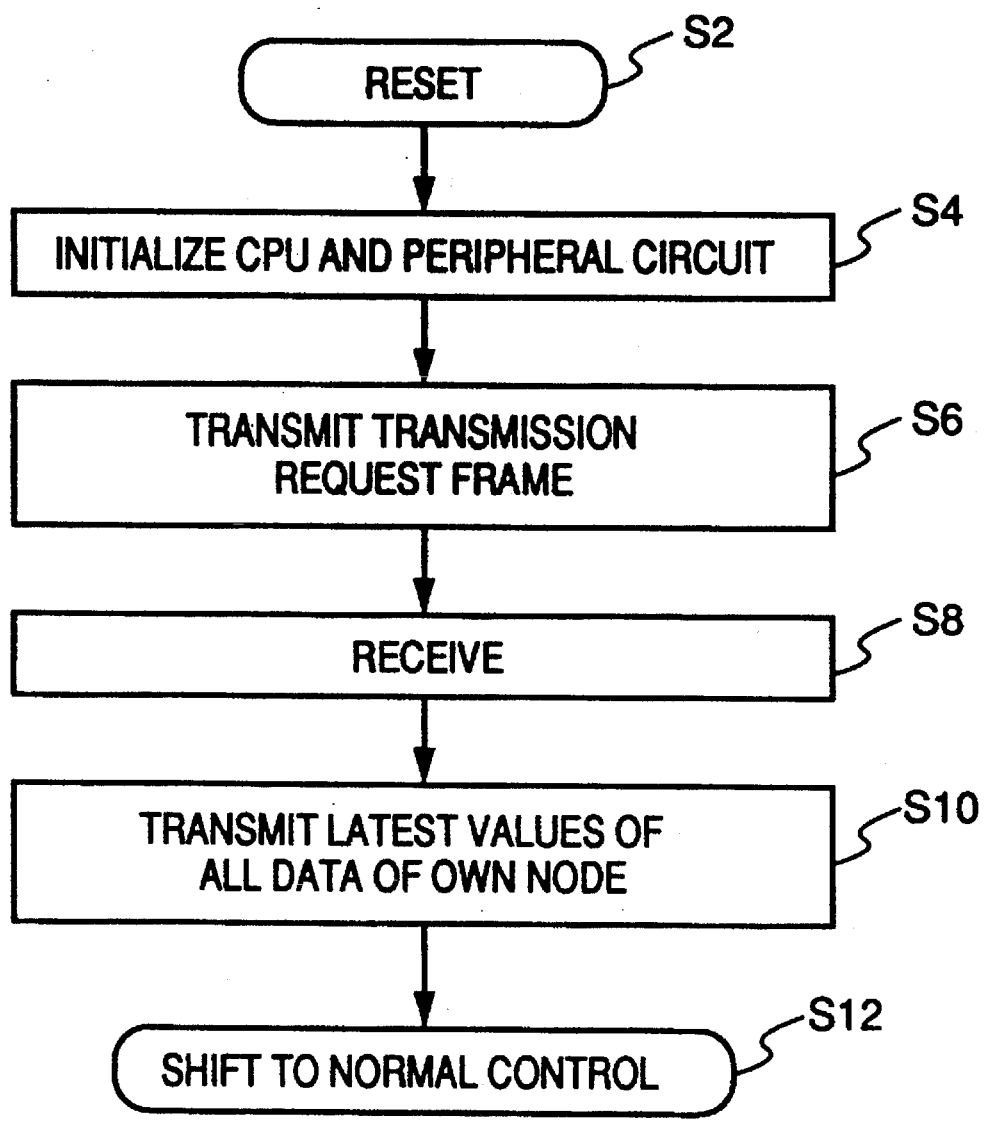
FIG. 5 is a flow chart showing processing executed when a certain communication node issues a data transmission request to another communication node in the multiplex transmission system of the embodiment shown in FIG. 1.

In the multiplex transmission system of this embodiment, in the above-mentioned case, each of the communication nodes A to E rewrites a predetermined data area in the frame F, and transmits the rewritten frame to another communication node to issue a transmission request, so that the other communication node transmits necessary data at the highest priority. For example, assume that the communication node A is reset due to, e.g., a communication abnormality. At this time, since the ON/OFF data of the lamps 1 and 2 and the motor 1 are cleared, the communication node A writes data representing the highest priority in the priority area P in the frame F; data indicating that the frame is a frame representing a data transmission request in the ID area I; the address of the communication node D In the data area D-0; ID(0) representing the ON/OFF data of the lamp 1 in the data area D-1; ID(1) representing the ON/OFF data of the lamp 2 in the data area D-2; and ID(2) representing the ON/OFF data of the motor 1 in the data area D-3. In this manner, the node A designates a node to which a transmission request is to be issued, and data to be transmitted from the designated node. FIG. 5 is a flow chart showing procedures until the communication node A transmits the frame F in which a node to which a transmission request is to be issued, and data to be transmitted from the designated node to another node.

Figures 7, 8:
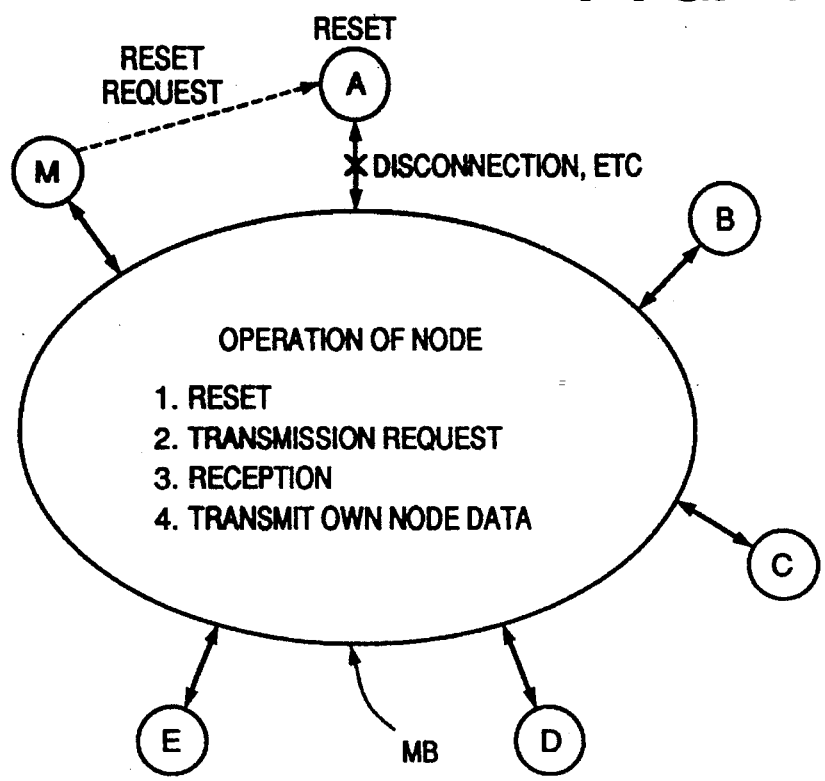
FIG. 7 is a diagram showing the arrangement of the multiplex transmission system shown in FIG. 1 more simply.
FIG. 8 shows the communication frame format for a conventional multiplex transmission node.

Referring to FIG. 5, when processing is started, a reset command is output in step S2. The reset conditions of, e.g., the node A will be explained below. FIG. 7 illustrates the multiplex transmission system shown in FIG. 1 more simply. The node will be reset in the following cases ① to ③:

① a node does not receive a frame for a predetermined period of time (e.g., 1 second) due to a disconnection between the multiplex transmission path and the node;

② the node A does not send back an ack bit representing reception of a frame independently of whether or not the node A itself receives data; and ③ a reset command is issued to all the nodes by the BROADCAST system.

Of these cases, in the cases ① and ②, the node A itself monitors its own frame reception state, and resets itself when it determines an abnormality. A master node M for controlling all the nodes shown in FIG. 7 is arranged to monitor the frame reception states of all the nodes, and when a frame is not received for a predetermined period of time or when only a certain node does not send back an ack bit, the master node M transmits a reset command to the corresponding node. Under the above-mentioned conditions, the node is reset.

Referring back to FIG. 5, when the reset command is issued in step S2, a CPU and a peripheral circuit of the node A are initialized in step S4. At this time, all the ON/OFF data of the lamps 1 and 2 and the motor 1 of the communication node A are cleared. Thereafter, in step S6, the communication node A writes, in accordance with the data format shown in FIG. 3, data representing the highest priority in the priority area P in the frame F; data indicating that the frame is a frame representing a data transmission request in the ID area I; the address of the communication node D In the data area D-0; ID(0) representing the ON/OFF data of the lamp 1 in the data area D-1; ID(1) representing the ON/OFF data of the lamp 2 in the data area D-2; and ID(2) representing the ON/OFF data of the motor 1 in the data area D-3, and transmits this frame as a transmission request frame F. Furthermore, in step S8, the node A receives a frame transmitted from the node D. In step S10, the node A transmits data representing the ON/OFF states of the lamps 1 and 2 and the motor 1 to be transmitted from its own node A as the latest values detected or calculated after initialization, and a normal communication state of the multiplex transmission system is started from step S12. The operation flow of the node A has been described.

Figure 6:
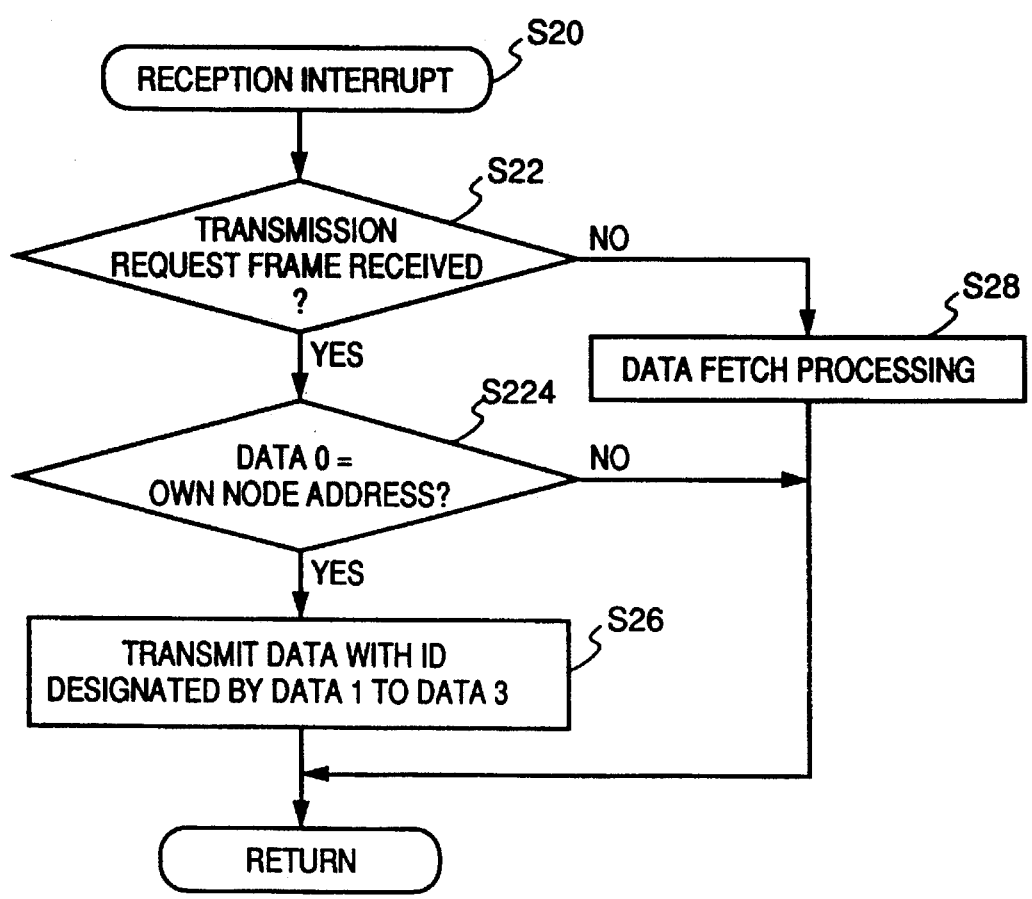
FIG. 6 is a flow chart showing processing until a communication node which received a data transmission request from another communication node transmits its own data in accordance with the transmission request in the multiplex transmission system of the embodiment shown in FIG. 1.

The operation flow of the node D will be described below. When the communication node A transmits the frame F in accordance with the flow chart in FIG. 5, since this frame F includes a destination address designating the communication node D, only the communication node D receives the frame F. Furthermore, since data to be transmitted from the communication node D are written and designated in ID(1) to ID(3) in the frame F, the communication node D writes data representing the ON/OFF operations of the lamps 1 and 2 and the motor 1 shown in FIG. 2 in the data areas of the frame F in accordance with the data designated in ID(1) to ID(3), and transmits the frame F. FIG. 6 is a flow chart showing procedures until the communication node D writes required data in the frame F in the data areas in accordance with the transmission request from the communication node A and transmits the frame F.

Referring to FIG. 6, when the processing is started, the node D is set in a reception interrupt state of the frame F in step S20, and checks in step S22 if a transmission request frame is received from another node (the node A in this embodiment). If it is determined in step S22 that the transmission request frame from the node A is received (YES in step S22), the flow advances to step S24. In step S24, it is checked if the address of its own node is written in the data area D(0) in the received transmission request frame. If it is determined in step S24 that the address of its own node is written (YES in step S24), the node D determines that the received transmission request frame is transmitted to its own node, and the flow advances to step S26. In step S26, the communication node D writes data representing the ON/OFF states of switches of the lamps 1 and 2 and the motor 1 shown in FIG. 2 as the data of its own node designated in ID(1) to ID(3) in this frame in the data areas of the frame F, and transmits the frame F. Thereafter, the control returns to the beginning of the operation.

On the other hand, if it is determined in step S22 that the transmission request frame is not received (NO in step S22), the flow advances to step S28 to execute normal data fetch processing, and the control returns. If it is determined in step S24 that the address of its own node is not written in the received frame (NO in step S24), the control returns to the beginning of the operation.

Figure 4:
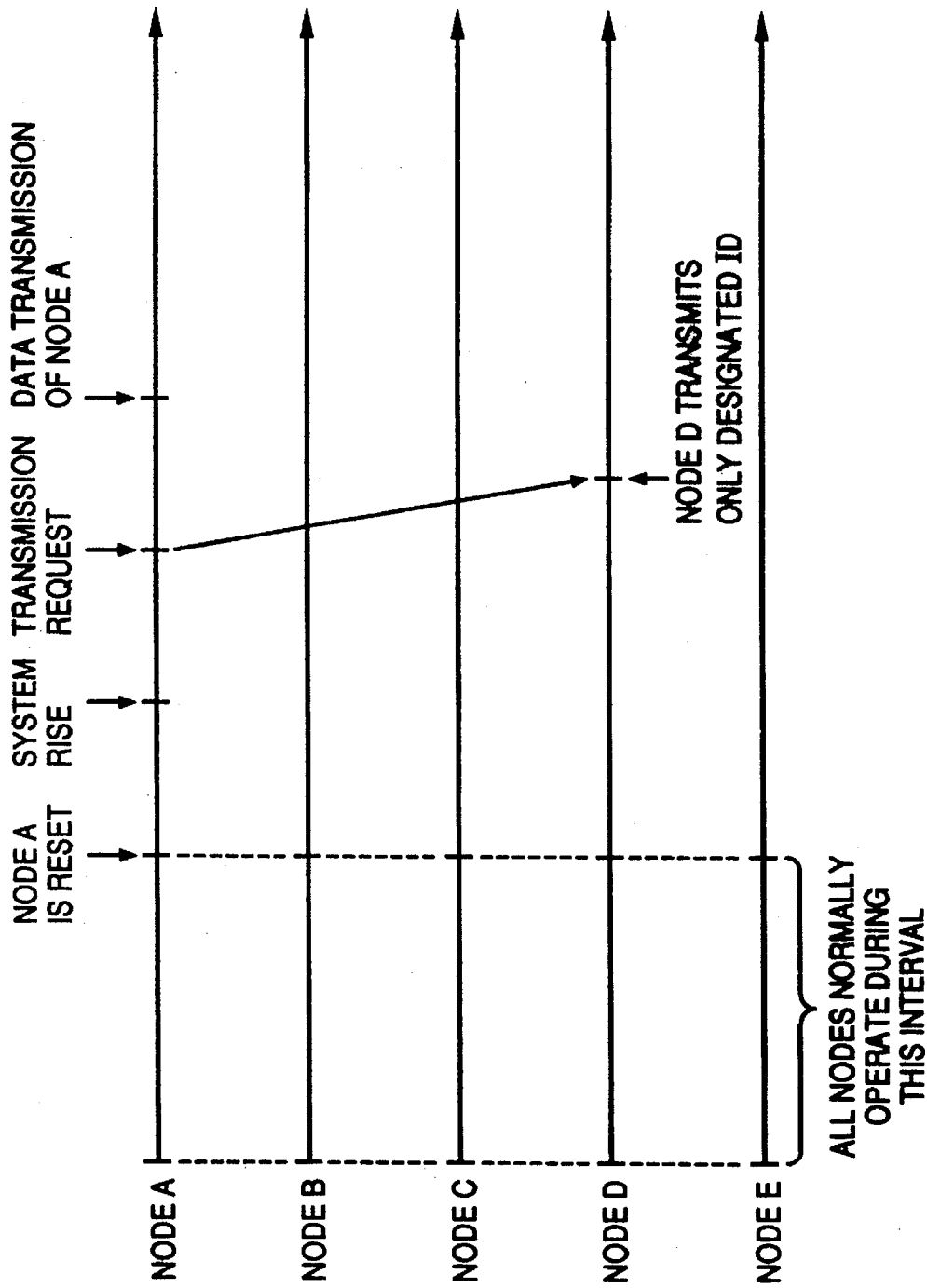
FIG. 4 is a timing chart showing a case wherein a communication node A issues a data transmission request to a communication node D in the multiplex transmission system of the embodiment shown in FIG. 1.

FIG. 4 is a timing chart showing the above-mentioned operations. In the descriptions of the flow charts, a case has been exemplified wherein only one communication node A is reset. Even when two or more communication nodes are reset at the same time, each communication node performs the same operations as in the communication node A, and can quickly acquire necessary data by designating a proper communication node and its ID. After each communication node acquires necessary data, the multiplex transmission system is restored to a normal communication state, and while the system performs normal communications, the frame F in a predetermined data area of which predetermined node data is written is transmitted and is received by other nodes.

As described above, in the multiplex transmission system described in this embodiment, no destination address area is assigned in advance in the communication frame, and when a sendback request is to be issued to another communication node in, e.g., a system rise state, the destination address of a communication node which is to receive this frame and ID data for specifying data to be sent back are written in existing frames such as a frame ID area, data write areas, and the like.

For this reason, when the system performs normal communications, since communications can be performed using a short frame having no destination address area, the busy time of the multiplex transmission line can be shortened, and the discrimination time of the communication node at the receiving side can also be shortened.

When a data transmission request is to be issued to another communication node, the transmitting side can specify a communication node which is to receive the frame, and can also specify data to be transmitted from the specified communication node. For this reason, only necessary data can be quickly acquired without receiving unnecessary data from other communication nodes.

The present invention is not limited to the above embodiments and various changes and modifications can be made within the spirit and scope of the present invention. Therefore, to apprise the public of the scope of the present invention the following claims are made.

What is claimed is:

1. A multiplex transmission system in which a plurality of communication nodes are connected to a multiplex transmission path, each of the communication nodes transmits a communication frame, in which event data of its own node is written onto the multiplex transmission path, and when a communication state is not a predetermined state, the communication frame is received by all the communication nodes, the communication node at a transmitting side comprising:

frame generation means for generating the communication frame including the event data;

discrimination means for discriminating whether or not the communication state of the communication node at the transmitting side is the predetermined state; and format changing means for, when it is determined that the communication state is the predetermined state, changing a data format of the communication frame to write data representing that the communication frame is a data transmission request frame in an existing data area of the communication frame to be transmitted from the communication node, and to write an address of the communication node which is to receive the communication frame, and transmitting the communication frame, and the communication node at a receiving side comprising:

frame transmission and reception means for receiving the communication frame whose data format has been changed, and transmitting a new communication frame in which event data designated by the received communication frame is written.

2. The system according to claim 1, wherein said format changing means writes a type of event data to be transmitted from the communication node designated by the address in the existing data area in the communication frame to be transmitted from the communication node at the transmitting side.

3. The system according to claim 2, wherein the communication frame has a first data area in which the type of the event data is to be written, and a second data area in which the event data is to be written, and when the communication state is the predetermined state, the data representing that the communication frame is the data transmission request frame is written in the first data area, and an address of the communication node which is to receive the communication frame and the type of the event data to be transmitted from the communication node designated by the address are written in the second data area.

4. The system according to claim 1, wherein the communication frame has a third data area in which data representing a priority order used when the communication frame contends with another communication frame, and when the communication state is the predetermined state, the data indicating a top priority order is written in the third data area.

5. The system according to claim 1, wherein said format changing means changes the communication frame to be transmitted from the transmitting side to a data transmission request frame which is to be issued from one to another communication node of the plurality of communication nodes.

6. The system according to claim 5, wherein the data transmission request frame is transmitted when the communication node at the transmitting side recovers from the predetermined state.

7. The system according to claim 1, wherein the predetermined state of the communication state is a state wherein the communication node at the transmitting side is started or reset.

8. The system according to claim 1, wherein the event data is data representing an operation state of a vehicle.

9. A multiplex transmission apparatus which is connected to a multiplex transmission path and transmits a communication frame in which its own event data is written onto the multiplex transmission path, comprising:

detection means for detecting a predetermined condition at a transmitting side;

frame generation means for generating a communication frame to be transmitted from the transmitting side, by changing a data format of the communication frame and writing data representing that the communication frame is a data transmission request frame and an address of a receiving side which is to receive the communication frame in an existing area of the communication frame, on the basis of the detection result; and frame transmission means for transmitting the communication frame.

10. The apparatus according to claim 9, wherein said frame generation means writes, a type of event data to be transmitted from the receiving side corresponding to the address, in the existing data area of the communication frame to be transmitted from the transmitting side.

11. The apparatus according to claim 10, wherein the communication frame has a first data area in which the type of the event data is to be written, and a second data area in which the event data is to be written, and when the communication state is the predetermined state, the data representing that the communication frame is the data transmission request frame is written in the first data area, and an address of the communication node which is to receive the communication frame and the type of the event data to be transmitted from the communication node designated by the address are written in the second data area.

12. The apparatus according to claim 9, wherein the communication frame has a third data area in which data representing a priority order used when the communication frame contends with another communication frame, and when the communication state is the predetermined state, the data indicating a top priority order is written in the third data area.

13. The apparatus according to claim 9, wherein said frame generation means generates the communication frame to request transmission of event data from the transmitting side to the receiving side.

14. The apparatus according to claim 9, wherein the data transmission request frame is transmitted when the transmitting side recovers from a state wherein the predetermined condition is detected.

15. The apparatus according to claim 9, wherein the predetermined condition is a state wherein said multiplex transmission apparatus is started or reset.

16. The apparatus according to claim 9, further comprising means for transmitting a communication frame in which latest event data of the transmitting side after a response to the data transmission request frame is received.

17. The apparatus according to claim 9, wherein the event data is data representing an operation state of a vehicle.

18. A multiplex transmission apparatus for receiving a communication frame including event data transmitted from a transmitting side via a multiplex transmission path, comprising:

reception means for receiving the communication frame transmitted from the transmitting side;

detection means for detecting whether or not a specific communication frame is received; and frame generation means for, when it is detected that the specific communication frame is received, generating a new communication frame in which predetermined data designated by the specific communication frame is written, without changing the length of the communication frame.

19. The apparatus according to claim 18, wherein said frame generation means writes its own event data in an existing data area of the communication frame on the basis of the predetermined data designated by the specific communication frame.

20. The apparatus according to claim 18, wherein said frame generation means generates the communication frame to be transmitted from the receiving side to the transmitting side, in which designated data is written.

21. The apparatus according to claim 18, wherein the specific frame is a data transmission request frame which is transmitted when the transmitting side recovers from a state wherein the transmitting side is started or reset.

22. The apparatus according to claim 21, wherein the communication frame has a first data area in which the type of the event data is to be written, and a second data area in which the event data is to be written, and when the communication state is the predetermined state, the data representing that the communication frame is the data transmission request frame is written in the first data area, and an address of the communication node which is to receive the communication frame and the type of the event data to be transmitted from the communication node designated by the address are written in the second data area.

23. The apparatus according to claim 21, wherein the communication frame has a third data area in which data representing a priority order used when the communication frame contends with another communication frame, and when the communication state is the predetermined state, the data indicating a top priority order is written in the third data area.

24. The apparatus according to claim 18, further comprising means for, when it is detected that the specific communication frame is not received, receiving the communication frame in which latest event data at the transmitting side is written, and updating event data which is possessed by the receiving side and is necessary for the transmitting side to the latest event data.

25. The apparatus according to claim 18, wherein said detection means detects whether not an address of the receiving side is written in the communication frame received by said reception means.

26. The apparatus according to claim 18, wherein the event data is data representing an operation state of a vehicle.

27. The apparatus according to claim 18, wherein said frame generation means changes a data format of the communication frame to write the predetermined data designated by the specific communication frame.

* * * * *